United States Patent [19]

Nuttall

[11] Patent Number: 5,138,322
[45] Date of Patent: Aug. 11, 1992

[54] METHOD AND APPARATUS FOR RADAR MEASUREMENT OF BALL IN PLAY

[75] Inventor: Jerry A. Nuttall, Midvale, Utah

[73] Assignee: Matrix Engineering, Inc., Midvale, Utah

[21] Appl. No.: 747,380

[22] Filed: Aug. 20, 1991

[51] Int. Cl.⁵ .................. G01S 13/38; G01S 5/06
[52] U.S. Cl. .................... 342/126; 342/127; 342/129; 342/463; 273/29 R
[58] Field of Search .............. 342/59, 126, 463, 465, 342/127, 129; 273/29 R

[56] References Cited

U.S. PATENT DOCUMENTS

| | | | |
|---|---|---|---|
| 2,406,953 | 9/1946 | Lewis | 342/126 X |
| 3,243,812 | 3/1966 | Williams | 342/126 X |
| 3,577,144 | 5/1971 | Girault | 343/14 |
| 3,706,096 | 12/1972 | Hammack | 343/9 |
| 3,832,709 | 8/1974 | Klein et al. | 343/5 |
| 4,024,540 | 5/1977 | Ofverberg | 343/14 |
| 4,238,795 | 12/1980 | Schiek et al. | 343/14 |
| 4,398,195 | 8/1983 | Dano | 342/126 X |
| 4,453,825 | 6/1984 | Buck et al. | 356/5 |
| 4,537,502 | 8/1985 | Miller et al. | 356/5 |
| 4,545,576 | 10/1985 | Harris | 273/25 |
| 4,673,183 | 6/1987 | Trahan | 273/176 A |
| 4,675,816 | 6/1987 | Brandon et al. | 364/410 |
| 4,698,634 | 10/1987 | Alongi et al. | 342/22 |
| 4,718,028 | 1/1988 | Gussin et al. | 364/572 |
| 4,833,480 | 5/1989 | Palmer et al. | 342/125 |
| 4,858,922 | 8/1989 | Santavaci | 273/26 |
| 4,977,405 | 12/1990 | Nothnick | 342/162 |
| 5,082,263 | 1/1992 | Berger | 273/29 R |

Primary Examiner—Gilberto Barrón, Jr.
Attorney, Agent, or Firm—Cahill, Sutton & Thomas

[57] ABSTRACT

A system for continuously and precisely measuring the positions of a generally symmetrical object, e.g., a tennis ball, in motion in a predefined three-dimensional region, e.g., a tennis court, which transmits multiple radar signals from first, second, and third, spaced antenna devices, respectively, into the three-dimensional region. Multiple return signals are sensed and are compared with the transmitted signals to determine the phases of the return signals, to thereby obtain ambiguous ranges of the object. Ambiguities are removed by using the Chinese Remainder Theorem to obtain less-ambiguous ranges. Time-of-arrival range information is used in conjuction with the less-ambiguous ranges to provide unambiguous ranges over the range of interest. The unambiguous ranges are used to compute three-dimensional coordinates of the object that are accurate to within approximately 0.1 inches. A mathematical model defining boundaries of the three-dimensional region is completed by placing signal reflector devices on various boundary points of the three-dimensional region, and transmitting the radar signals when the object is not in the three-dimensional region. Coordinates of a projected trajectory are computed and compared with the actual coordinates of the object, and certain characteristics are computed therefrom. Calibration of the system is maintained by placing signal reflector devices at various fixed locations within the region of interest and the return signals are processed to obtain an initial survey of the region and then to periodically resurvey the region.

14 Claims, 12 Drawing Sheets

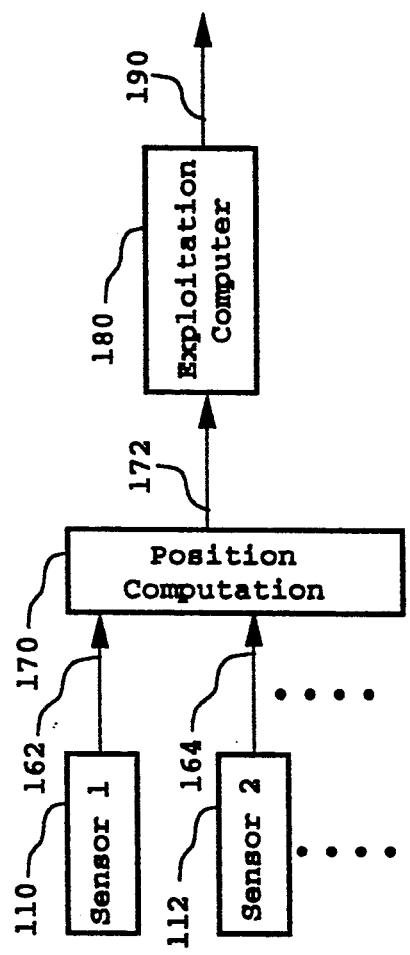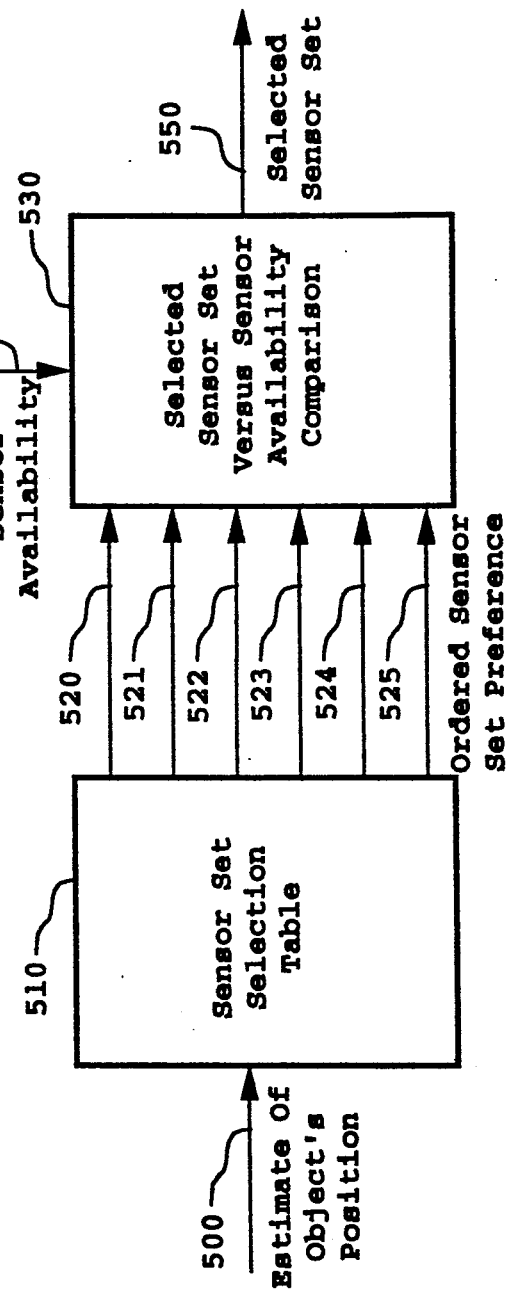

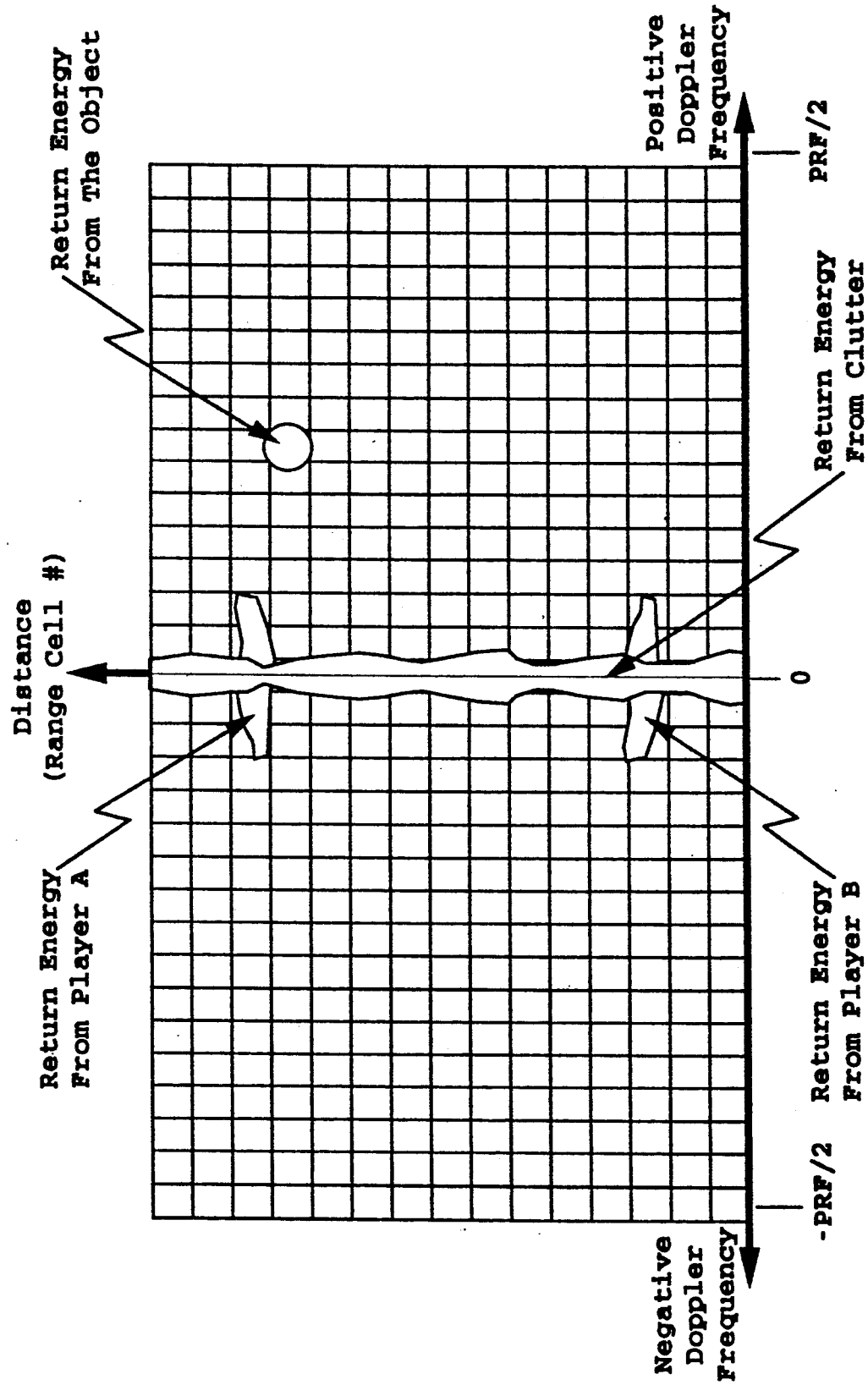

METHOD AND APPARATUS FOR RADAR MEASUREMENT OF BALL IN PLAY

BACKGROUND OF THE INVENTION

The invention relates to precision radar range measurements of an object, or objects, (such as a tennis ball or baseball in play hereinafter referred to as the "object") based on the phase of the radar return from the "object", with measurements made at multiple frequencies, the Chinese Remainder Theorem being used to remove the range ambiguity inherent in using the phase as a measurement of range, and the radar return of the "object" of interest being separated from the radar return of competing clutter.

For fifteen years or more, the professional tennis community has been seeking a device to automatically call the lines in tennis matches, thus replacing up to eleven line umpires (including the net judge) per match and reducing the number of altercations during a match. Many devices have been built but most, if not all, have had some failing or limitation which made them unacceptable. It is highly probable that radar was considered by many of those attempting to find a solution. A radar solution probably was not given serious consideration because standard radar technology is incapable of achieving the required accuracy. The present invention removes this limitation.

For baseball, at least one attempt has been made to provide electronic tracking of a pitched ball. U.S. Pat. No. 4,545,576 discloses such a device using video cameras. To date, while partially successful, it has not proven sufficiently accurate to call balls and strikes (See UNIX Today! Mar. 18, 1991).

Standard radar techniques use the time of arrival of the return from an "object" as the basis of a range measurement. One-foot accuracy with such techniques is considered to be excellent. Also with such standard techniques, the radar-return's pulse-to-pulse phase difference is used for Doppler frequency measurements, but not to improve range measurement accuracy. However, as far as it is known, the phase of the return in conjunction with multiple transmitter frequencies and the Chinese Remainder Theorem has never before been used to make precision measurements of the range to an "object" (such as a tennis ball or baseball in flight).

The Chinese Remainder Theorem is presently used in some radar systems to resolve range ambiguities. But again, the range measurements are based on the time of arrival of the radar-return. In addition, the radar's pulse-repetition frequency (not the transmitted frequency as proposed herein) is the parameter which is varied to provide the necessary information for the Chinese Remainder Theorem.

In the field of laser range finders, the use of multiple laser modulating frequencies, phase detection and the Chinese Remainder Theorem has been proposed in U.S. Pat. No. 4,537,502. This prior art also mentions direct use of multiple frequencies instead of modulating a laser beam. This prior art specifically requires a "counting frequency $f_o$" such that the multiple frequencies are related by:

$$f_o = N_r N_1 \cdot f_1 = N_r N_2 \cdot f_2 = \ldots$$

This prior art relates the accuracy of the technique to the size of $N_r$ and thus to the size of $f_o$. To obtain the accuracies sought with the current invention, such a counting frequency would be required to be in the order of 200 GigaHertz, which is well beyond the state of the art for the practical use of such a counting frequency. The need for such a counting frequency and the resulting restrictions is considered to be unique to the proposed instrumentation of the prior art and does not apply to the present invention.

SUMMARY OF THE INVENTION

It is an object of the invention to provide a radar tracking device for precise measurement of the position of an object with an accuracy of less than a tenth of an inch.

Another object of the invention is to combine sets of range measurements so as to measure the three-dimensional position of an object with an accuracy of less than a tenth of an inch.

Another object of the invention is to provide a technique for precisely measuring the distance from a radar sensor to a symmetrical object with a precision to within a small fraction of a wavelength of the radiated energy and to avoid inaccuracy caused by competing clutter.

Another object of the invention is to provide a technique for reducing controversy and altercations during sporting events by eliminating human error in making calls.

Another object of the invention is to provide an accurate, almost instant, automatic technique for calling points in a tennis match, strikes in baseball, etc.

Briefly described, and in accordance with one embodiment thereof, the invention provides a system for continuously (tens of thousands of measurements per second) and precisely measuring the position of a generally symmetrical object in motion (the "object") in a predefined three-dimensional region in which multiple radar signals are transmitted from each of first, second, and third spaced antenna devices, respectively, into the three-dimensional region. The first, second, and third spaced antenna devices must not be collinear, or nearly collinear, in order to obtain accurate position measurements by trilateration. Furthermore, if the object approaches the plane defined by the positions of the first, second, and third, spaced antenna devices, then the measured position accuracy is reduced. The addition of a fourth antenna device not located in the same plane as the other three can alleviate such a reduction of accuracy. The object reflects multiple return signals corresponding to the multiple radar signals. The multiple return signals are sensed by means of receivers connected to the first, second, and third antenna devices, respectively. The multiple return signals are compared with the multiple radar signals, respectively, t determine the phases of the multiple return signals relative to the phases of the multiple radar signals, respectively, to thereby obtain ambiguous representations of ranges of the object relative to the first, second, and third antenna devices. Ambiguities of the first, second, and third ranges are removed by using modular arithmetic (with the use of the Chinese Remainder Theorem being the method of choice) to obtain first, second, and third less-ambiguous ranges relative to the antenna devices. First, second, and third time-of-arrival information is used in conjunction with the less-ambiguous ranges to obtain first, second, and third unambiguous ranges of the "object". Three-dimensional coordinates of the object are then computed using the unambiguous ranges. In the described embodiment, the object is a tennis ball and the three-dimensional region includes a tennis court. The first, second, and third antenna devices are located outside of the tennis court. Radar signals are transmitted from a plurality of additional spaced antenna devices, and the foregoing techniques are used to obtain additional unambiguous three-dimensional coordinates of the object, to allow averaging of multiple corresponding values of each of the three-dimensional coordinates to obtain final three-dimensional coordinates of the object. A "sanity check" may also be used to eliminate from the average those coordinate estimates which are not consistent with the majority of estimates or of previous estimates.

The accuracy to which the position of each antenna device is known directly affects the accuracy of the position measurement of the object. As an alternative to precision surveying for obtaining the position of each antenna device, a plurality of signal reflectors are placed at various fixed positions relative to the three-dimensional region, and each antenna device transmits the multiple radar signals at a time or times convenient for such activity. The foregoing techniques are performed to obtain the unambiguous distance from each antenna device to each signal reflector device, from which the three-dimensional coordinates of each of the antenna devices and signal reflector devices can be computed by solving multiple equations in multiple unknowns. A minimum of four antenna devices are required for use of this procedure. There is also a minimum number of signal reflector devices required. The minimum number of signal reflector devices depends upon the number of antenna devices. The first time this is performed, it effectively creates a precise survey of the antenna device positions. For additional occasions on which this technique is performed, each of the coordinates of each antenna device is then compared to a prior value of that coordinate to determine an amount by which the position of that antenna device has changed, for example due to temperature change.

Similarly, as an alternative to precision surveying, a mathematical model defining boundaries of the three-dimensional region is completed by placing signal reflector devices on various boundary points of the three-dimensional region, and transmitting the multiple radar signals at a time or times convenient for such defining measurements. The foregoing techniques are performed to obtain unambiguous three-dimensional coordinates of each of the signal reflector devices and thus of the boundary model. The above method of obtaining the model of the three-dimensional region is generally forgiving of some device imperfections since some of these same errors are also embedded in the model.

Unambiguous three-dimensional coordinates of the "object" in motion in the three-dimensional region are continuously compared to court-model boundaries determined by the mathematical model, and indications (e.g., audio signals) are produced when a three-dimensional coordinate of the "object" in motion exceeds a boundary of the mathematical model, e.g., when the ball is out of bounds. Coordinates of a projected trajectory of the "object" in motion (the tennis ball) are computed and compared with the actual coordinates of the "object" in motion, and a preselected characteristic (e.g., ball spin, net ball) of the "object" is computed from the differences.

BRIEF DESCRIPTION OF THE DRAWINGS

FIG. 4 is a block diagram useful in describing the invention.

FIG. 5 is a block diagram useful in describing the sensor set selection.

FIG. 16 is a diagram illustrating a range/Doppler array output for a tennis ball in flight.

DETAILED DESCRIPTION OF THE PREFERRED EMBODIMENT OF THE INVENTION

Figure 1:
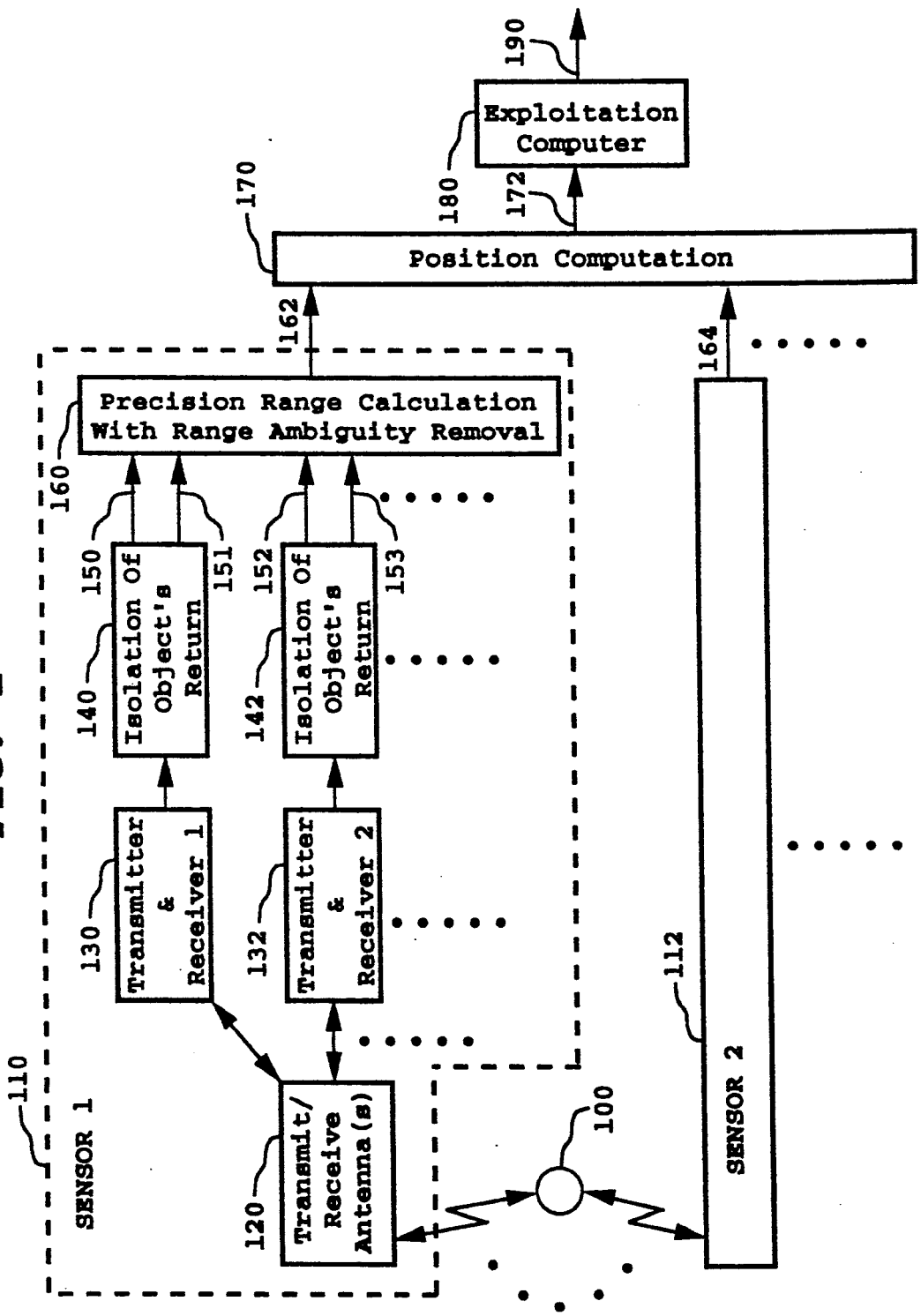
FIG. 1 is a basic block diagram of the present invention.

The invention includes a radar device for precision measurement of the distance from the sensor to the object as previously defined. Using multiple sensors, the multidimensional position of the object can be determined to good precision via trilateration. Such measurements can be made at a rapid rate (tens of thousands of times per second). Thus the object can be tracked in its (or their) motion to very high precision.

The device of the invention uses the phase of the radar-return from the object to measure the precise but ambiguous distance from the sensor to the object. The device makes multiple range measurements using two or more transmitted frequencies. Then it uses the Chinese Remainder Theorem to resolve the range ambiguity over the spatial field of interest. The accuracy of such measurements can be a small fraction of a wavelength of the radiated energy.

To obtain the desired precision, the radar-return from the object must be made large compared to noise and the return from competing clutter by a selection of suitable noise and clutter reduction techniques. Using sufficient transmitter power and/or using a low-noise-figure receiver and/or coherent Doppler processing ensures that the return from the object is large compared to noise. (See Skolnik, Merrill I., "Radar Handbook", Chapter 23, McGraw-Hill, N.Y., 1970.)

There are many ways to reduce the return from clutter. These techniques can be used individually or in combinations to reduce the competing clutter return. One such technique is to control the radiation pattern so as to minimize the energy transmitted to or received from objects outside the area or spatial domain of interest. Another technique is to cover competing objects with radar absorbing and/or deflecting material. A third is to range-gate the return thus eliminating all clutter at ranges sufficiently different from that of the object. A fourth is to pass the return through a Doppler filter, eliminating clutter that has a sufficiently different Doppler frequency than that of the object. If the clutter return is static, a fifth technique is to determine an estimate of the return from the clutter alone and then subtract the estimated clutter return from the combined return of the clutter and the object.

Potential applications of the object-tracking device of the invention include:

1. Calling the lines in tennis matches. The device can call all lines as well as service lets with no modification to the ball or court. The device can track the entire flight of the ball, giving such auxiliary data as ball speed, ball acceleration, height of ball travel, depth of ball travel, whether the player is hitting on the rise, how deep the ball is when it is struck, what type of spin (top, under, or side spin), and how much spin the player placed on the ball, etc.

2. Calling pitches (balls and strikes) and foul balls at baseball games. Again, the ball-tracking device can track the entire flight of the ball giving such auxiliary data as ball speed, ball acceleration, location of each pitch with respect to the strike zone, whether the pitch is a fast-ball, curve-ball; slider, and quantify the amount of curve on a pitch, etc. The device can also determine the depth of hits such as home runs.

3. Making goal-tending calls at basketball games.

4. Making line calls at such other games as jai alai, volleyball, racquetball, handball, squash, etc. Again, the device can provide auxiliary information similar to that described above for tennis and baseball.

5. Tracking golf balls. The device can provide ball-flight characteristic information for the players and/or the media, such as length of each shot, the height of each shot, the amount and type of spin, etc.

6. Scoring skeet and trapshooting. A sensor, or sensors, can track the clay pigeon. If a chip is removed from the target by a pellet, the apparent motion is modified and could be detected by the sensor. For this application, it may not be necessary to know the unambiguous range so, it may not be essential to use the multiple frequencies and Chinese Remainder Theorem.

7. Scoring accuracy of projectiles in artillery ranges and bombing ranges.

FIG. 1 is a basic block diagram of the invention. The object is designated by numeral 100. One or more sensors 110, 112, etc. each measure the distance from its antenna's phase center to the object. A sensor performs this measurement by using two or more transmitters and receivers 130, 132, etc., each of which is at a different frequency. All the transmitters and receivers for a given sensor use the same antenna aperture 120. The signal from each receiver contains the returns from everything within the antenna beam. The returns from the object must be isolated from the return of the clutter. This is accomplished with isolation circuits 140, 142, etc. by using some or all of the techniques listed earlier.

The output of each of the isolation circuits 140, 142, etc. is the phase of the return 150, 152, etc. from the object and the crude range to the object as measured by the time of arrival 151, 153, etc. As mentioned earlier, the phase of the radar-return from the object is used to measure the precise but ambiguous distance from each sensor to the object. The basic equation for relating range and the phase of the return is:

$$\phi_{1a} = Mod\left(\frac{4 \cdot \pi \cdot R_a}{\lambda_{1a}}, 2 \cdot \pi\right)$$

or, alternatively $$Mod\left(R_a, \frac{\lambda_{1a}}{2}\right) = \frac{\phi_{1a} \cdot \lambda_{1a}}{4 \cdot \pi}$$

Where
$Mod(A,B) = A - B \cdot Int(A/B) =$ The modulo function.
$Int(X) =$ The largest integer less than or equal to X.
$\pi = 3.14159265\ldots$
$R_a =$ The range from the a-th sensor to the object. Some deterministic corrections may be required, such as for the transmitter/receiver delays and the distance from the object's center to its return phase center.
$\lambda_{1a} = c/f_{1a} =$ The wavelength of the first frequency of the a-th sensor.
$c =$ The speed of light in the medium of interest.
$f =$ The first frequency of the a-th sensor.
$\phi_{1a} =$ The phase of the object's return relative to the reference signal plus corrections for deterministic effects such as transmitter and receiver delays, etc.

The subscript letter refers to the sensor and the subscript number refers to the frequency within a sensor. There are similar equations for all of the other frequencies and sensors.

Also, as mentioned earlier, a sensor uses the Chinese Remainder Theorem executed by computing circuitry in Block 160 to greatly enlarge the unambiguous range interval. The Chinese Remainder Theorem uses the multiple ambiguous range measurements as provided by the use of the multiple transmitted frequencies.

An example is perhaps the easiest way to illustrate the principle of the Chinese Remainder Theorem: A man is in an enclosed room with no windows. He takes a sleeping pill and falls asleep. When he wakes up, he wants to know how long he has been asleep. To provide this information, he has two clocks in the room. One is a standard clock with 12 hours per revolution. The second is a special clock that has only 11 hours per revolution. When he went to sleep both clocks were at zero o'clock (12 o'clock for the standard clock and 11 o'clock for the special clock). When he wakes up the standard clock reads 3 o'clock and the special clock reads 5 o'clock. The solution of this problem can be obtained without the use of the Chinese Remainder Theorem, however the Chinese Remainder Theorem provides a simple straightforward solution and thus its use is the method of choice. The Chinese Remainder Theorem is used to determine how long he was asleep provided he was not asleep for more than 132 (11 times 12) hours.

First set $N_1=12$, the modulus of the first clock, and $N_2=11$, the modulus of the second clock. Now let $R_a$, the number of hours he was asleep, be an integer less than $N_1$ times $N_2$ (i.e., 132). Assume that the value of $R_a$ is unknown, but for the example it is chosen to be 27. The values of $m_{1a}$ and $m_{2a}$ are the readings of the two clocks when he awoke. For the numbers in the example, $$m_{1a} = 3 = Mod(R_a, N_1)$$

$$m_{2a} = 5 = Mod(R_a, N_2)$$

Then, the Chinese Remainder Theorem specifies that there are numbers $M_1$ and $M_2$ such that $R_a$ is given by $$Mod(R_a, N_1 \cdot N_2) = Mod(m_{1a} \cdot M_1 + m_{2a} \cdot M_2, N_1 \cdot N_1)$$

For the case of $N_1=12$ and $N_2=11$, the corresponding values of $M_1$ and $M_2$ which satisfy the theorem are $M_1=121$, and $M_2=12$. That is:

$$Mod(R_a, 132) = Mod(423, 132) = 27$$

for $m_{1a}=3$ and $m_{2a}=5$

The congruence in the Chinese Remainder Theorem becomes an equation for any value of $R_a$ less than $N_1$ times $N_2$.

More clocks can be used if even larger unambiguous intervals are desired. The number of N's increases with the number of clocks. For any given set of N's, there is a corresponding set of M's which is used to determine $R_a$. The values of the M's can be derived deterministically using the Euclidean Algorithm - see Niven, Ivan Zuckerman, Herbert S., "An Introduction To The Theory Of Numbers", Third Edition, John Wiley & Sons Inc., New York, 1972 (Theorem 1.11 on p. 7), however, they can also be derived easily by trial and error with the aid of the following facts.

$$M_1 = p_1 \cdot N_2 \cdot N_3 \cdot \ldots$$
$$M_2 = p_2 \cdot N_1 \cdot N_3 \cdot \ldots$$
$$\vdots$$
$$Mod(M_1, N_1) = 1$$
$$Mod(M_2, N_2) = 1$$
$$\vdots$$

The values of $p_1, p_2, \ldots$ are all integers which can be determined by trial and error such that their corresponding M modulos are 1.

Throughout this document, the values of the N's and M's are assumed to be the same for all sensors. While this would generally be the case, it is not essential. They could be different for each sensor.

For simplification, it will be assumed herein that there are three values of N and three corresponding values of M. The values of the N's and M's are assumed to be:

$$N_1 = 15 \quad M_1 = 2176$$
$$N_2 = 16 \quad M_2 = 3825$$
$$N_3 = 17 \quad M_3 = 2160$$

With this example as background, the application of the Chinese Remainder Theorem to the invention will now be explained. To accommodate the Chinese Remainder Theorem, the wavelengths of the transmitted frequencies for a sensor are related to each other by a common distance, $\Delta X_a$, via the following equations:

$$\frac{\lambda_{1a}}{2} = N_1 \cdot \Delta X_a$$

$$\frac{\lambda_{2a}}{2} = N_2 \cdot \Delta X_a$$

$$\vdots$$

where $N_1, N_2, \ldots$ are each integers with no common factors, i.e., they are (pairwise) relatively prime. As mentioned above, it is assumed that there are three values of N as given above. The unambiguous range interval after the application of the Chinese Remainder Theorem is $$\Delta X_a \cdot (N_1 \cdot N_2 \cdot \ldots) \text{ or equivalently } (N_2 \cdot \ldots) \cdot (\lambda_{1a}/2).$$

$$= 11.333 \text{ feet for } N_1 = 15$$
$$N_2 = 16$$
$$N_3 = 17$$
$$\lambda_{1a} = 1 \text{ in.}$$

The values assumed above imply that $\Delta X_a = 0.0333$ inches.

The actual number of different frequencies (and thus the number of N's) is determined by the extent of the required unambiguous range. The resultant unambiguous range interval after the application of the Chinese Remainder Theorem should be larger than the range uncertainty remaining from the time-of-arrival range measurement, or some other measurement, or from a priori knowledge.

The values of $\Delta X_a, N_1, N_2, \ldots$ are selected at the designer's discretion as long as the values of $N_1, N_2, \ldots$ are relatively prime. The range to the object is then given by the Chinese Remainder Theorem as:

$$Mod(R_a, \Delta X_a \cdot N_1 \cdot N_2 \cdot \ldots \cdot N_N) = \Delta = Mod[\Delta X_a(m_{1a}M_1 + m_{2a}M_2 + \ldots + m_{Na}M_N + Frac_a), \Delta X_a \cdot N_1 \cdot N_2 \cdot \ldots \cdot N_N]$$

With $$m_{1a} = Int\left(\frac{\lambda_{1a} \cdot \phi_{1a}}{4 \cdot \pi \cdot \Delta X_a}\right)$$

$$m_{2a} = Int\left(\frac{\lambda_{2a} \cdot \phi_{2a}}{4 \cdot \pi \cdot \Delta X_a}\right)$$

$$\vdots$$

$$m_{Na} = Int\left(\frac{\lambda_{Na} \cdot \phi_{Na}}{4 \cdot \pi \Delta X_a}\right)$$

-continued $$Frac_a = \left(\frac{1}{N}\right) \cdot (Frac_{1a} + Frac_{2a} + \ldots + Frac_{Na})$$

N = The number of different frequencies used.

$$Frac_{1a} = \frac{\lambda_{1a} \cdot \phi_{1a}}{4 \cdot \pi \Delta X_a} - m_{1a}$$

$$Frac_{2a} = \frac{\lambda_{2a} \cdot \phi_{2a}}{4 \cdot \pi \Delta X_a} - m_{2a}$$

.
.
.

$$Frac_{Na} = \frac{\lambda_{Na} \cdot \phi_{Na}}{4 \cdot \pi \Delta X_a} - m_{Na}$$

Except for noise and other contamination, the values of $Frac_{1a}, Frac_{2a}, \ldots, Frac_{Na}$ should all be the same. (In the example of the clocks, the minute hands should read the same.) Care should be taken to ensure that they are close to the same value by adjusting the values of the m's. As an example, let $Frac_{1a}=0.01$, $Frac_{2a}=0.02$, and $Frac_{3a}=0.99$, then $m_{3a}$ should be incremented by 1 which then makes $Frac_{3a}=0.01$.

This completes the description of the use of multiple frequencies in conjunction with the Chinese Remainder Theorem and the resultant precision range measurement. The discussion now returns to Block 160 of FIG. 1, for Precision Range Calculation With Ambiguity Removal. The precise but ambiguous range is computed for each frequency channel using the phase of the object's return. The circuitry in Block 160 then uses the Chinese Remainder Theorem to greatly expand the unambiguous range interval. Other information, including the time-of-arrival range measurement, can be used to even further increase the unambiguous range interval. The unambiguous range measurement from each sensor 162, 164, . . . goes to the position computation circuit 170 where the three-dimensional position of the object is computed. This precise position information goes to the exploitation computer 180, the details of which are application-dependent; in most cases it includes the virtually continuous comparison of the object's position relative to the playing area. The output 190 of the exploitation computer 180 goes to the user or users.

The required accuracy for many applications demands that the sensors are calibrated with great precision and that the playing area be surveyed with great precision.

Another aspect of this invention is a mechanism for alleviating the required calibration and surveying precision. This mechanism is to use the tracking system itself to survey the playing area.

Figure 2:
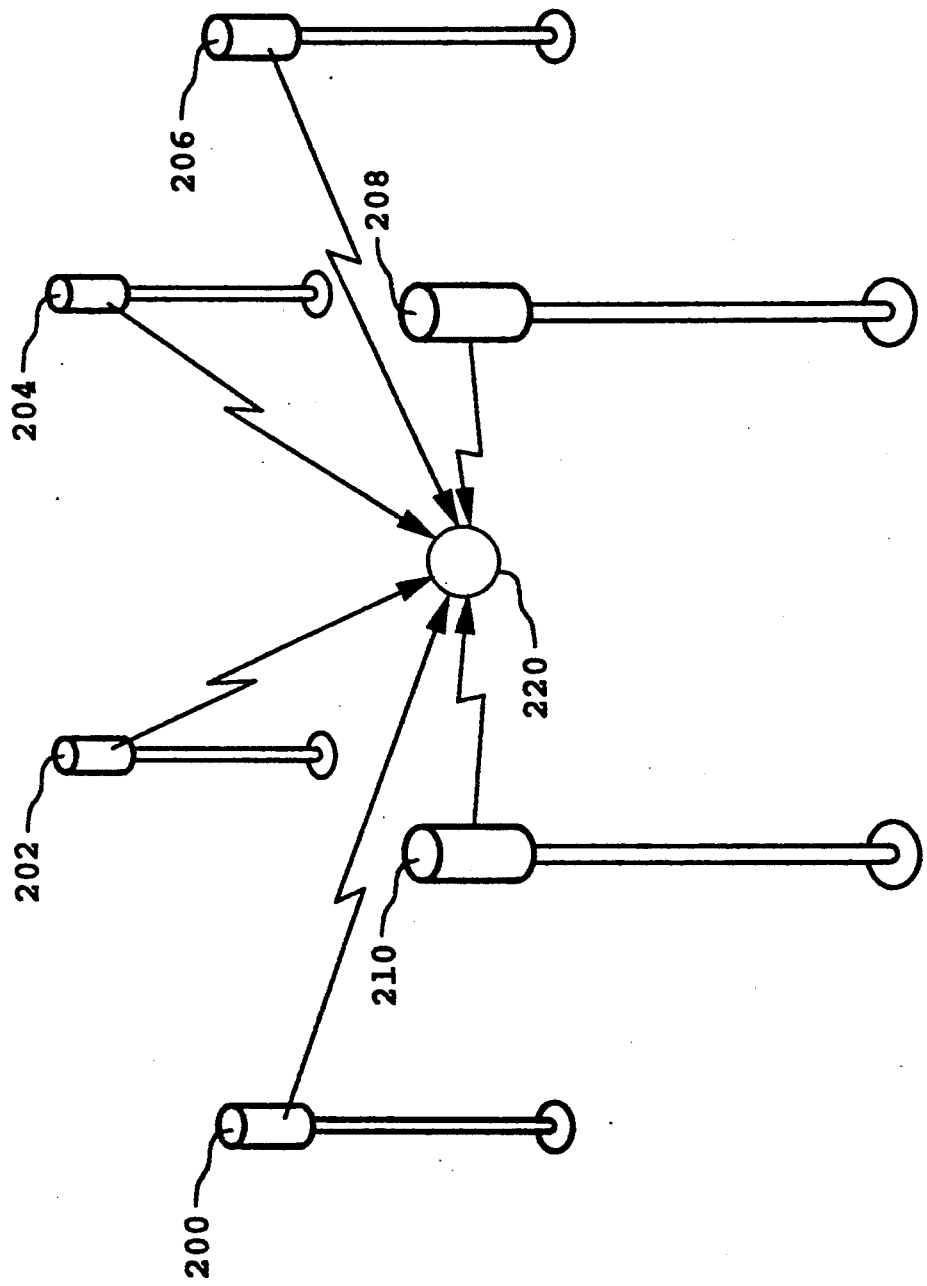
FIG. 2 is a perspective schematic diagram illustrating locations of multiple antenna devices relative to an "object" of interest.

At least three sensors are used for trilateration. The actual number of sensors would vary depending upon the application. Six antenna devices 200, 202, 204, 206, 208, and 210, one for each of six sensors, are shown in FIG. 2. Each sensor precisely measures the distance from its antenna phase center to the object 2220. Since only three measurements are required for trilateration, the extra sensors cover additional area, are used to ensure that at least three sensors have adequate signal-to-noise and signal-to-clutter ratios, are used to provide even more accuracy to the position measurement, etc.

The trilateration used to convert the range measurements from multiple sensors to a three-dimensional position measurement is not unique to this invention (see Skolnik, Merrill I., "Radar Handbook", Chapter 36.8, McGraw-Hill, New York, 1970).

Figure 3:
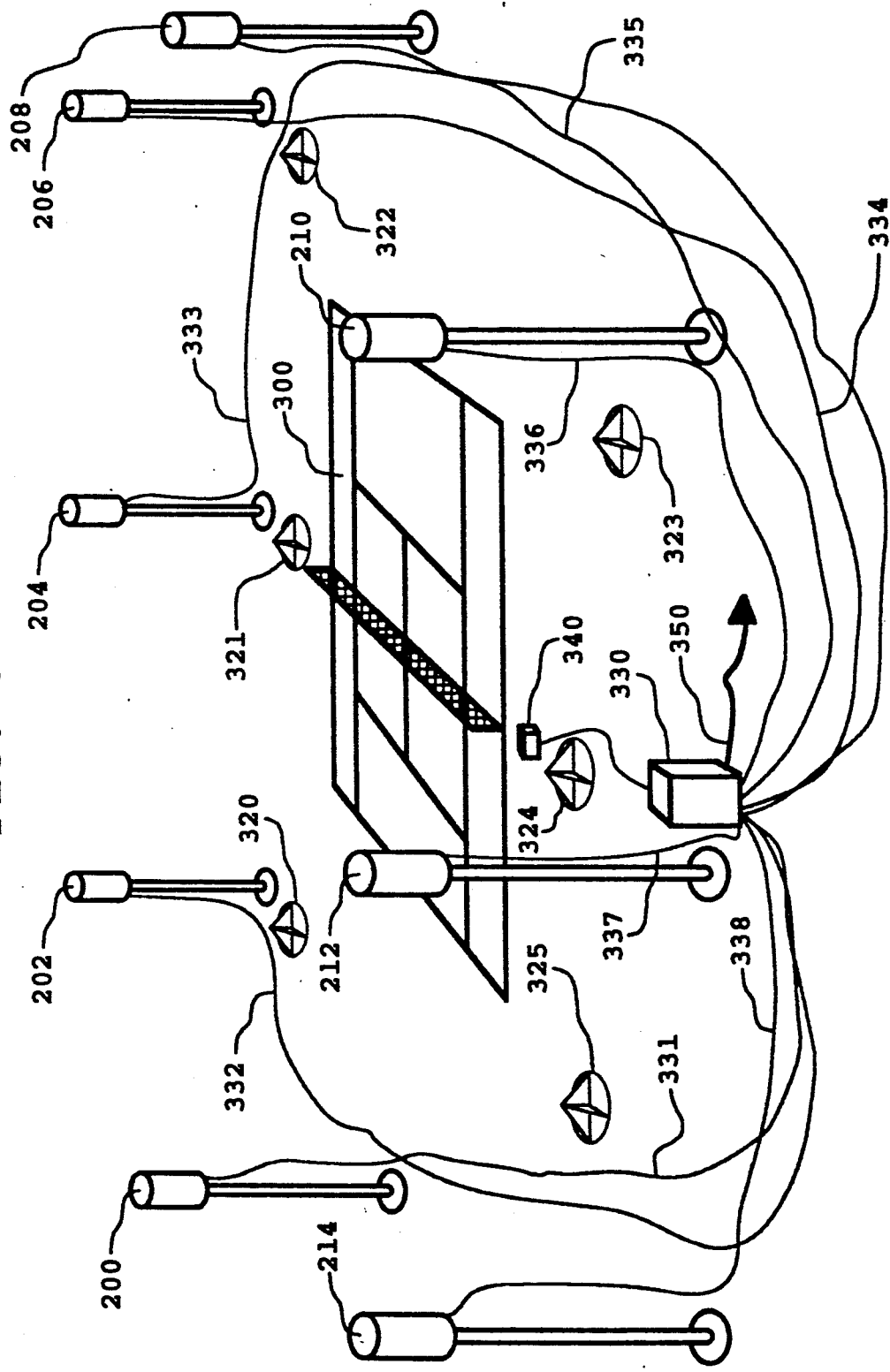
FIG. 3 is a perspective diagram of an embodiment of the invention for tracking the flight of a tennis ball during play on a tennis court.

FIG. 3 illustrates a more specific example for the tennis application. A tennis court 300 is shown with eight antenna devices 200 through 214 more or less symmetrically located around it. The positioning of the antenna devices is not extremely critical, but they should be significantly elevated above the court surface to ensure sufficient position accuracy when the ball is close to the court surface and to minimize beam blockage. They could be mounted on poles, as shown, or they could be mounted on the stadium structure, etc. The positions of the antenna devices, once they are in place, must be calibrated to good precision. As conditions such as temperature change, the positions of the antenna devices may change and a new calibration may be required. One way to alleviate the need for such new calibrations is to use the device to recalibrate its own position. Immediately after the initial calibration, each sensor measures the distance from its antenna phase center to each of the quad-corner-reflectors 320 through 325. As conditions change, each sensor again measures the distance from its antenna phase center to each of the quad-corner-reflectors. The differences between the new measurements and the old measurements can be used to determine how much and in which directions the sensors and the corner reflectors have moved to allow correction for such motion. In the example there are 48 (8 sensors times 6 quad-corner-reflectors) measurements taken and 42 (3 degrees of motion for each of the 8 antenna phase centers and 6 quad-corner-reflectors) unknowns to be determined. Standard algebra and/or numerical analysis can provide the estimates of all 42 unknowns i.e., an estimate of the displacement of each sensor and each quad-corner-reflector. This recalibration can be performed during breaks in play. The placement of the corner reflectors should be somewhat symmetrical as shown; however, care must be exercised to ensure that no two corner reflectors occupy the same range bin in any sensor, or that the corner reflectors are all normally kept covered and are uncovered, during calibration or recalibration, one at a time. In this way, the radar-returns from every corner reflector can be detected by each sensor.

The initial position calibration could be performed with precision surveying equipment, but the preferred method is to use the above recalibration technique. The equations are non-linear and difficult to solve explicitly. The Newton-Raphson method for iterative approximations is one technique to solve such equations. (See William H. Press et al., "Numerical Recipes", Cambridge University Press, 1986.) The difference between the initial calibration and the recalibration is the number of iterations of the Newton-Raphson technique. Many iterations will normally be required for the initial calibration due to the inaccuracy of the first estimate of the positions of the corner reflectors and the antenna devices. One iteration would normally suffice for the recalibration.

Returning to FIG. 3, Processor 330 also contains the common components shared by multiple sensors. Cables 331-338 connect the processor 330 to the various antenna devices. Each such cable could be replaced with an optical or other kind of link. Block 340 contains the interface and control box for the umpire. Cable 350 connects the processor 330 to television- and radio-media broadcasting equipment.

FIG. 4 is a basic block diagram of the electronic equipment. Each sensor 110, 112, etc. measures the distance to the object with an accuracy of a small fraction, e.g. one-thirtieth, of the radar wavelength. This measurement can be repeated at a very high rate. The effective pulse-repetition-rate (PRF) can be tens or even hundreds of thousands of times per second. A substantial amount of hardware can be shared between the sensors 110, 112, etc. A more detailed description of the sensors is given later.

The outputs 162, 164, etc. of the sensors 110, 112, etc. are the precision range measurements.

Position Computation Circuit 170 performs the trilateration and outputs a signal 172 representing the object's position in three dimensions. The signal 172 is input to an exploitation computer 180. The accuracy of the trilateration is a function of the position of the sensors relative to the object, so some thought should be given to the sensor placement. The equations for trilateration (see Skolnik, Merrill I., "Radar Handbook", Chapter 36.8, McGraw-Hill, New York, 1970) are available elsewhere. The trilateration function as well as other processing functions (discussed later) could be performed in easily-designed application-specific hardware, in a general-purpose computer, or in a combination of the two, depending upon the rate and number of calculations desired.

In most cases there will be more sensors than just the minimum required for the multi-dimensional position calculations. In the tennis example there are 8 sensors, although, as mentioned earlier, only 3 are required for trilateration. One choice is to use the extra sensors to obtain even more accuracy. This could be done by using the sensors, three at a time, in most of the possible combinations (about 50 for the tennis example), to obtain multiple estimates of the object's position. Each estimate is given a "sanity check", and all estimates not consistent with the majority of other estimates or previous estimates are discarded. The remaining estimates are averaged to obtain the final estimate. Another choice for the use of the extra sensors is to just use the required number and ignore the rest. Under this condition, another task to be performed by Position Computation Circuit 170 is the selection of which sensors to use for the position computation.

FIG. 5 is a chart illustrating one method for the selection of sensors. Signal 500 is the last estimate of the three-dimensional position of the object or the estimate of where the object will appear. This position information 500 is used as the address in a simple look-up table 510 which yields the ordered preference for the sensor set to be used. Look-Up Table Output 520 is the preferred sensor set, Look-Up Table Output 521 is the second-choice sensor set and so on through Look-Up Table Outputs 522, 523, 524, and 525. The final sensor-set selection 540 is made between these choices, as indicated by Block 530, where the set of available sensors 540 is compared with the ordered preference of sensor sets. The sensor-set selection is rechecked any time the output of the look-up table changes or the available sensors change. A discussion of how the availability of a sensor is determined is given later in the discussion of the sensor.

Returning to FIG. 4, the exploitation computer 180 receives the position information and outputs its decisions and/or auxiliary data to the user or users. The details of this function are dependent on the application and even then the details may vary considerably from one user to another. An example will be given here for the tennis case.

Figure 6:
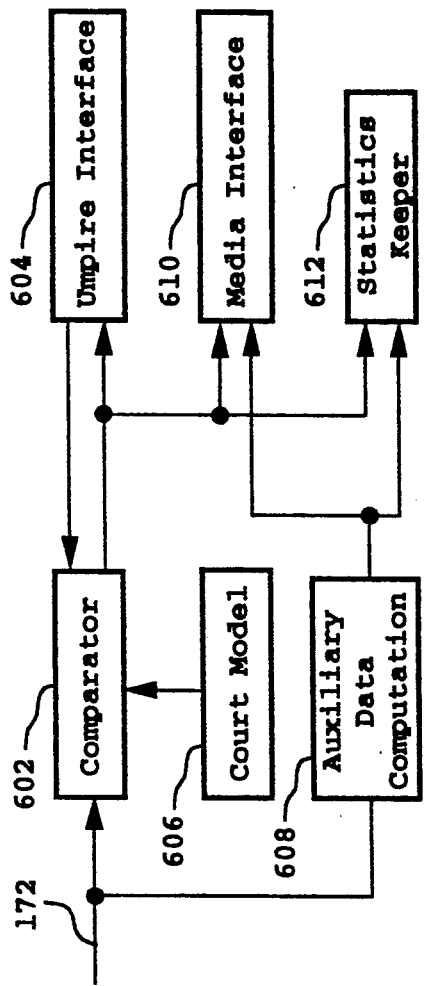
FIG. 6 is a block diagram of the typical functions of the exploitation computer box in FIG. 4.

Referring to FIG. 6, which shows the functions implemented by a typical exploitation computer, each point played in tennis starts with a serve. The comparator 602 tracks the flight of the ball using its three-dimensional position, represented by Signal 172, as it changes with time. In the vicinity of the net, the comparator 602 checks for velocity anomalies indicating that the ball touched the net. In any event, the comparator 602 continues to track the ball until it strikes the court surface, at which time a comparison is made between the ball's position and the service-box boundaries of the tennis-court model 606. A "fault" is called if the ball is outside the service-box boundary. A "let" is called if the serve touched the net but still landed inside the service box. If the serve was not a "let" nor a "fault", then the comparator 602 continues to track the flight of the ball and checks each time the ball strikes the court surface whether it was outside the playing area. If it lands outside, an "out-ball" is called. The comparator 602 has inputs from the court model 606 and from the umpire interface 604. The umpire indicates which service-box model to use and whether the singles or doubles court model should be used. The device is capable of automatically keeping score and keeping track of which service box-model to use, however, the umpire must be able to override any automatic operation.

The accuracy, in determining whether the tennis ball is inside or outside the boundary, would generally be enhanced by curve fitting a trajectory to the ball's position data received over a short period (a few milliseconds) prior to the ball's striking the court and again over a short period after the ball leaves the court. Such trajectory information would then be used to indicate where the ball first touched the court and last touched the court. (The accuracy of the ball's position measurement is generally at its worst when the ball is in contact with the court due to the ball's distortion and changing velocity.)

The model of the court is obtained at the same time as the sensor positions are calibrated. The positions of all the lines in the court could be obtained by precision surveying, however, the preferred method is to use the sensors themselves to obtain the court model. This is accomplished by placing a precision corner reflector sequentially at many positions along each line and then using the radar sensors (in sets of three at a time) to measure the three-dimensional position of the corner reflector at each position. The resultant models (one for each combination of three sensors) are stored in the non volatile memory of the exploitation computer 180. The great advantage of using the sensors to obtain the court model is that it relieves the sensor-calibration accuracy requirements. This is a result of the imperfections in the sensors being effectively neutralized by the same errors in the court model. There are many ways the exploitation computer 180 can handle the court model 606. One straightforward way is to enter the line positions in look-up tables stored in memory. When the ball nears the court surface, its position 172 is used as the address to a particular look-up table to determine the positions of the line or lines in the vicinity. Different look-up tables would be used for each combination of three sensors. The court need not be perfect, it can be humped, sloped, have curved lines or other anomalies.

Auxiliary data for the media and statistics keeping is also derived from the ball's position 172 as a function of time, as indicated by Block 608. The velocity of the ball is determined by comparing successive ball position measurements. The ball's flight with the expected flight if only gravity and drag were acting on the ball. Wind could affect the accuracy of the spin calculations. The direction and speed of ball travel after striking the court is another indication of spin. Other items of interest might include the depth of shots, the height of the ball's travel over the net, whether the player is hitting the ball on the rise, the position of the ball at the time the player strikes the ball, etc. This auxiliary data (along with the output of the comparator) can be made available to the media interface 610 and the statistics keeper 612.

Figure 7:
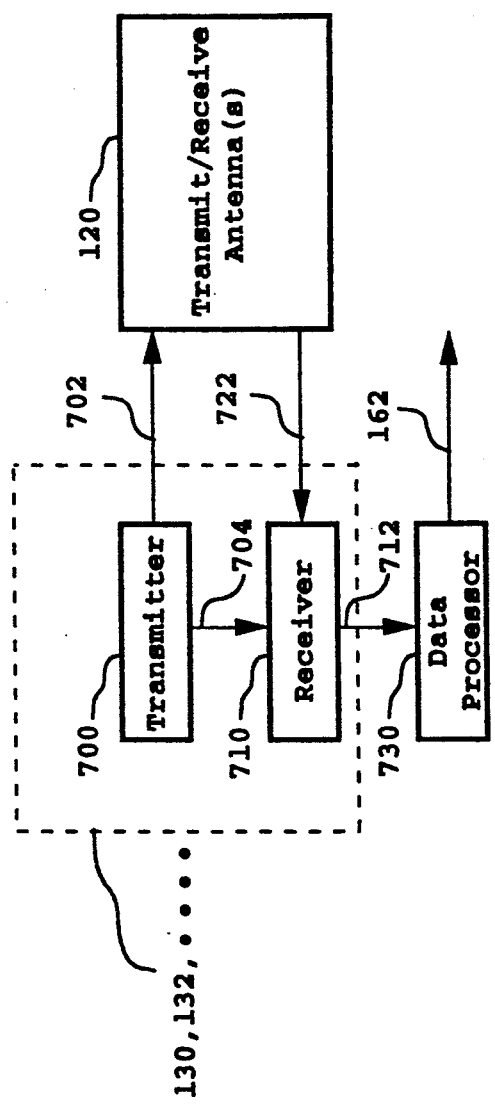
FIG. 7 is a simple block diagram of one sensor in FIG. 4.

FIG. 7 is a simple block diagram of one sensor. As with any other radar system, a sensor consists of a transmitter(s) 700, an antenna or antennas 120, a receiver(s) 710, and a signal processor 730.

Following is a list of steps describing the microwave portions of the sensor's operation.

1. A pulse is (or multiple pulses are) transmitted from each sensor and the echo (reflection or return) from the object (as well as all other scatterers in the antenna beam) is returned to the receiver. In most cases a stream of pulses is transmitted at an appropriate pulse-repetition-frequency (PRF). The multiple pulses generally improve the signal-to-noise ratio and allow Doppler filtering to aid in isolating the return of the nominally moving object from that of all other scatterers within the radar beam.

Figure 8:
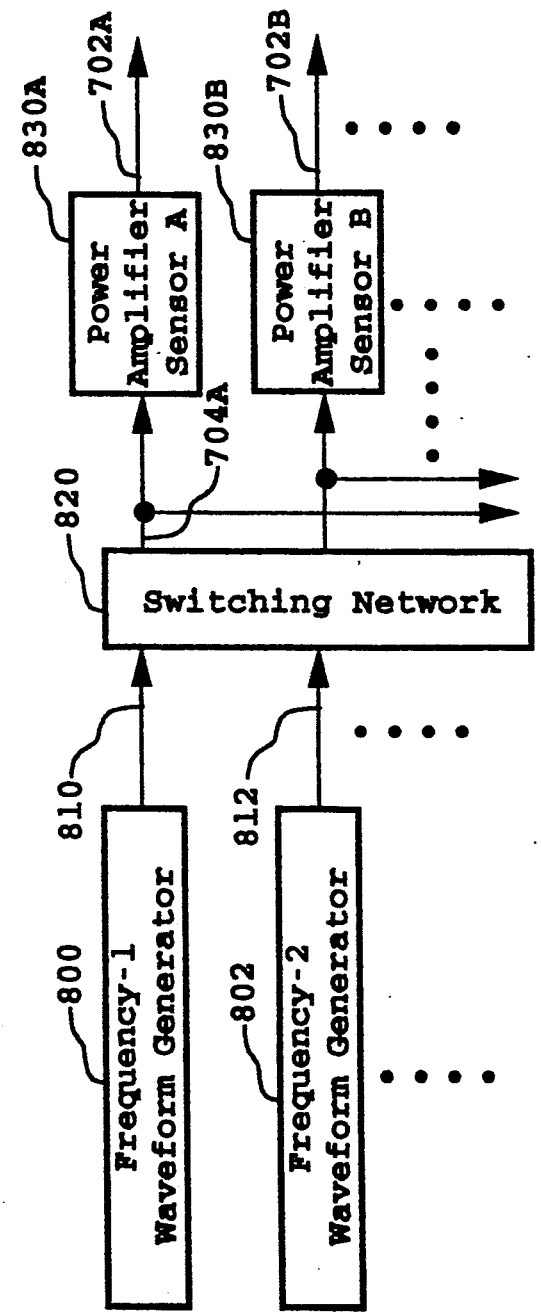
FIG. 8 is a block diagram of the transmitter in FIG. 7.

2. The transmission of multiple (three are assumed) frequencies is required for use with the Chinese Remainder Theorem. This is illustrated in FIG. 8, which is a simple block diagram of the transmitter 700 in FIG. 7. Waveform Generator 800 produces an output that is centered at the first frequency. Waveform Generator 802 produces an output that is centered at the second frequency, etc. The bandwidth of each of these waveform generators depends upon the desired time-of-arrival range resolution used for range-gating the data to reduce the clutter energy which could compete with the return from the object. Typical time-of-arrival range resolutions would be from 1 to 10 feet corresponding to a bandwidth between 600 Mhz and 60 Mhz with weighting (windowing). The frequency stability of these generators is critical since the range measurement (based upon the phase of the return) is inversely scaled with frequency.

The outputs of these generators 810, 812, etc. go to the switching network 820. All frequencies could be summed together and transmitted simultaneously, but it generally saves hardware to time-share the transmitter with the multiple frequencies. Thus the PRF would be multiplied by three (the number of frequencies) and a set of pulses (one for each frequency) would be transmitted at the original PRF. This time-sharing case is assumed for the rest of this discussion.

Figure 9:
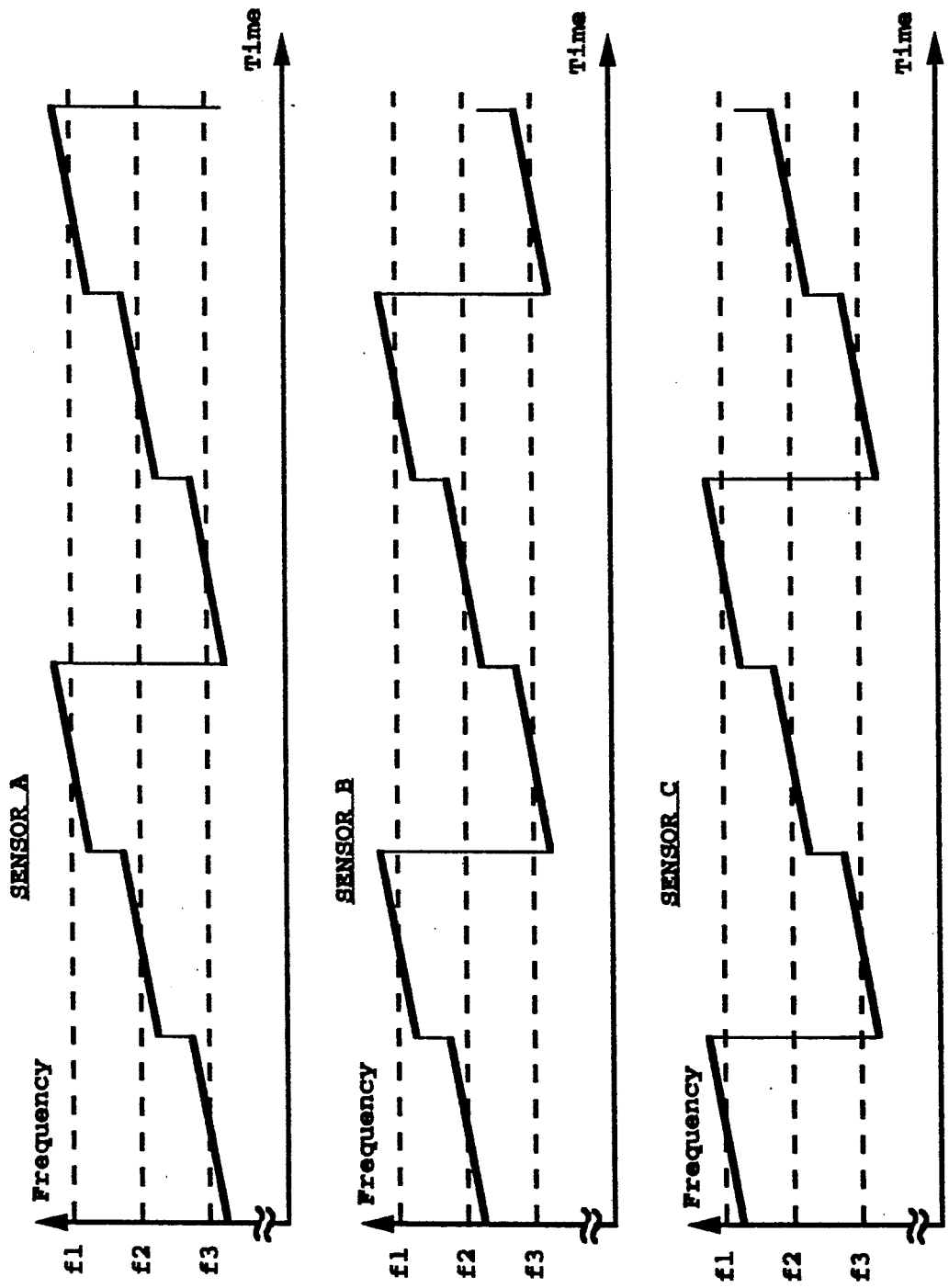
FIG. 9 is a timing diagram showing the resultant signals produced by three waveform generators in FIG. 8 after being switched between three sensors.

The power amplifier is thus time-shared between the multiple frequencies. In turn, each of the three waveform generators can be shared between three sensors as shown in FIG. 9. Thus the switching network 820 of FIG. 8 has three outputs, one for each of three sensors. Output $704_a$ for Sensor a of the switching network 820 goes to Power Amplifier $830_a$. It also goes to the receiver 710 of FIG. 7 where it is used as the reference for the radar-return signal.

Output $702_a$ of the power amplifier $830_a$ goes to the antenna system 120 of FIG. 7. The antenna system 120 has either one or two antennas. In the case of a single antenna, this one antenna is used for both transmitting and receiving. Some type of transmit/receive switch or circulator device would be used in this case. Two antennas are used in this preferred embodiment. With two antennas, one antenna is used for transmitting and the second for receiving. The received signal 722 goes to the receiver 710.

3. To avoid interference, no two sensors are allowed to transmit the same frequency during the same pulse interval. In the time-shared case, three (the number of frequencies) sensors can share the same set of three frequencies by staggering the order of transmission among the sensors. Again, this is illustrated in FIG. 9. Other sensors would have a different set of frequencies.

4. In the receiver 710, the return from each pulse is compared (mixed) with a coherent reference signal (or signals) to produce a video signal. The conversion of the radio-frequency (RF) return to video can be done in one step or in multiple steps using intermediate-frequency (IF) stages. For this preferred embodiment, it is converted in one step.

Figure 10:
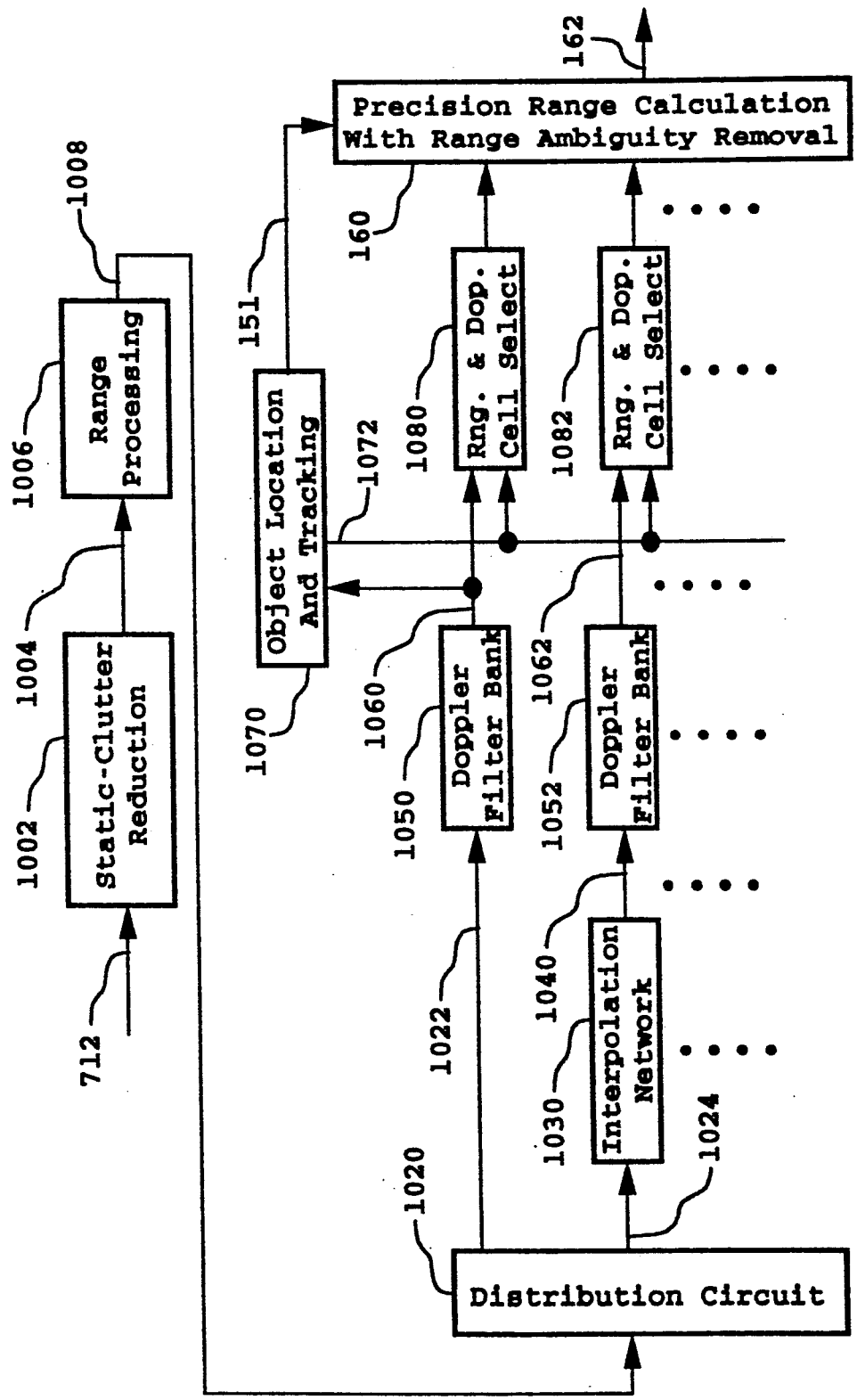
FIG. 10 is a block diagram of the data processor in the diagram of FIG. 7.
Figure 11:
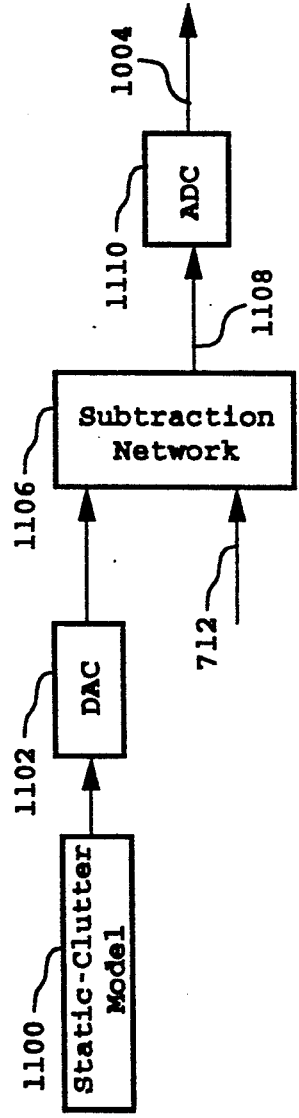
FIG. 11 is a block diagram of a subsystem in FIG. 10 for static-clutter reduction.

FIG. 10 shows a simple expansion of Data Processor 730 in FIG. 7. This is the processor for only one sensor. Only one input 712 is shown, which is consistent with the case of time-shared transmission between the multiple frequencies. The first processing operation is the reduction of the return from static clutter performed in the static-clutter reduction circuit 1002. This static-clutter reduction is not essential to the operation of the device but it does reduce the required dynamic range of the subsequent processing. FIG. 11 illustrates one method of instrumenting the static-clutter reduction. The static-clutter model 1100, if available, is stored digitally in the device. In synchronism with the radar return, the data of Model 1100 is read from memory, converted to a time-varying analog voltage in Digital-to-Analog Converter (DAC) 1102 and subtracted from the received signal 712 in the subtraction network 1106. The analog signal 1108 out of the subtraction network is converted to a sequence of digital words in Analog-to-Digital Converter (ADC) 1110. The DAC 1102 and the ADC 1110 use the same clock.

One method for obtaining the clutter model is to operate the system when the object of interest is not present. The sequence of words out of the ADC 1110 is then added (with appropriate scaling) to the current static-clutter model 1100. This operation could be repeated several times to ensure the convergence of the ADC output to near zero. If a long time-constant is used (a very small-scaling number is used) in the above collection process, then the clutter model can be continuously updated even when the object is present since, for most applications, the object would be at any given range position for a very small percentage of the time. Using this last technique requires the clutter to be only quasi-static.

The output 1004 of the static-clutter reduction circuit 1002 goes to the range-processing circuit 1006. The details of the range processing vary with the details of the transmitted waveform and how it was converted to a video signal. For this preferred embodiment, the waveforms shown in FIG. 9 are used. This is a linear-frequency-modulated/continuous-wave (linear fm-cw).

Figure 12:
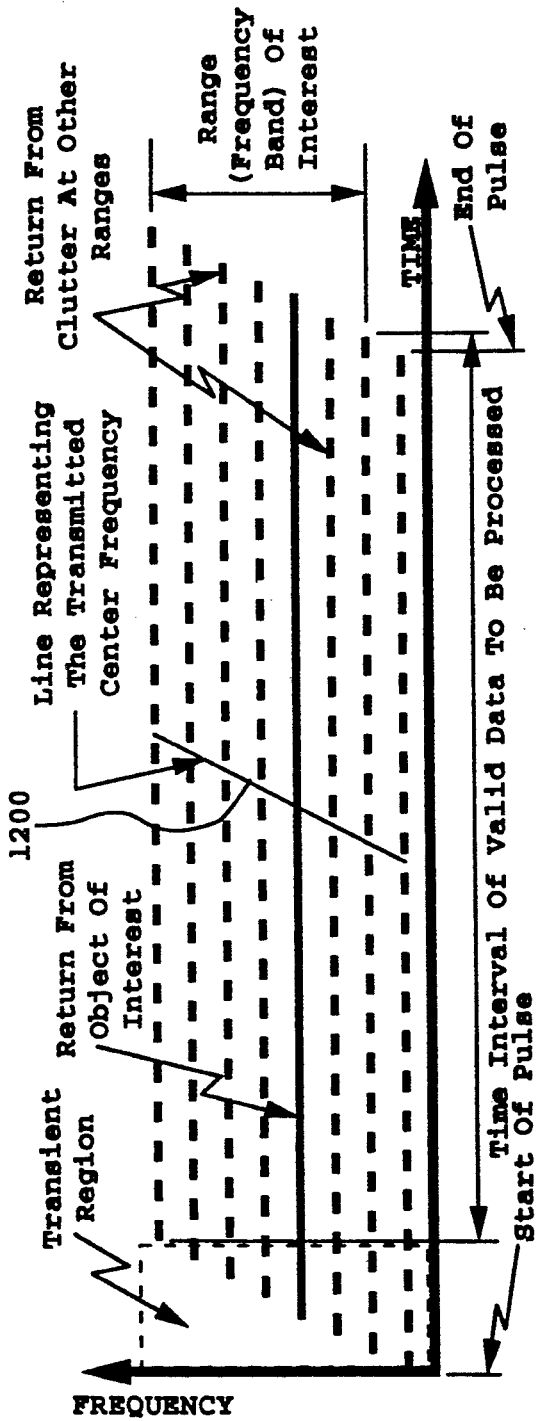
FIG. 12 is a diagram of frequency versus time for the receiver output in response to one pulse of one sensor.
Figure 13:
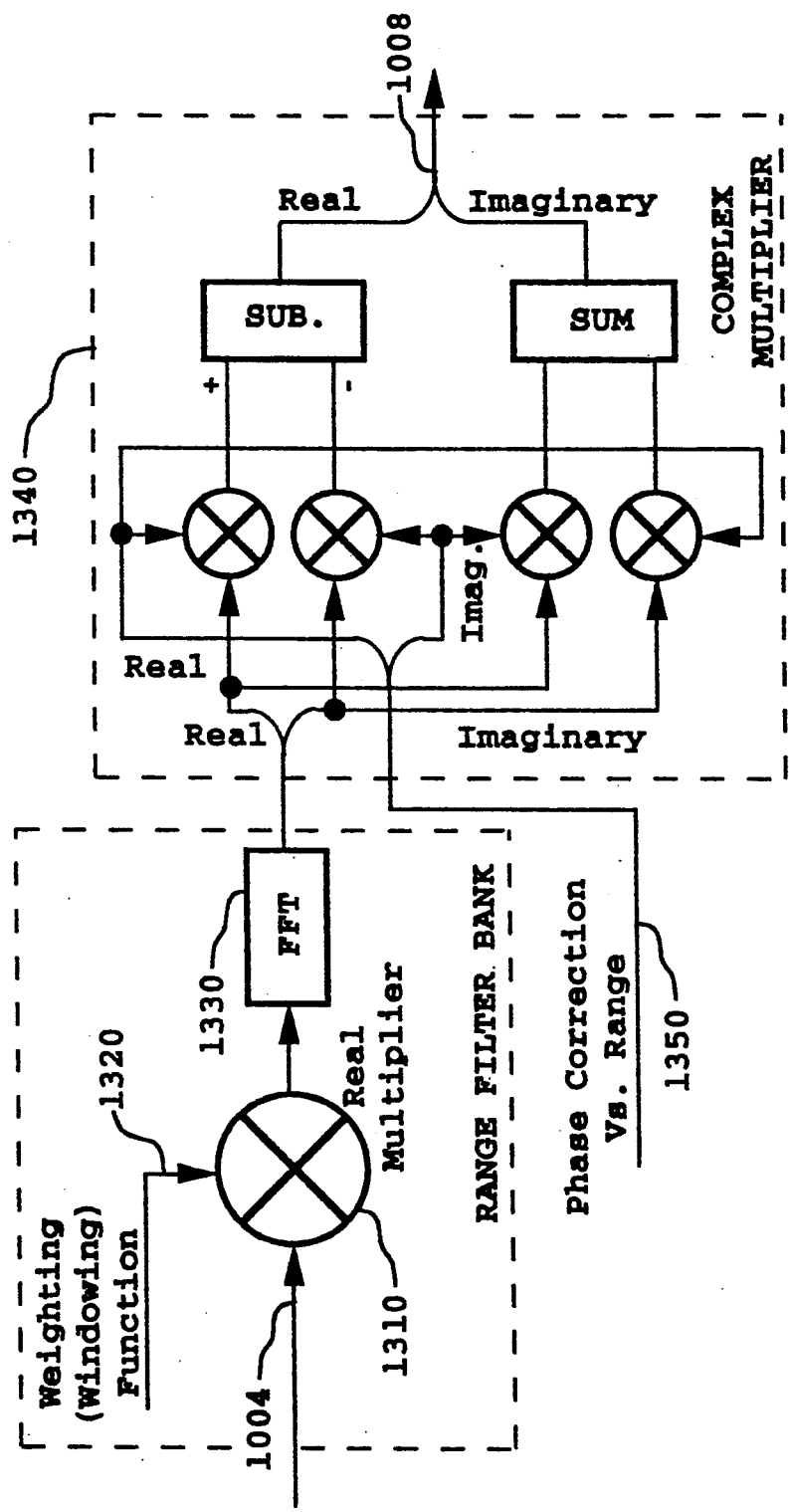
FIG. 13 is a block diagram of the range processing box in FIG. 10.

The time between the frequency switching transients is one "transmitter pulse". The same waveform is used as the reference in the receiver's mixer. The resultant receiver output waveform is shown in FIG. 12. The return from the object is virtually at a constant frequency. Clutter at a different range is also virtually at a constant but different frequency. The range processing is now provided by passing each return pulse through a bank of filters which can be easily implemented. FIG. 13 illustrates range processing operations including a Fast Fourier Transform (FFT) based instrumentation of such a filter bank. The Fourier-transform of Block 1330 converts the time-domain data points to frequency-domain data points (see Skolnik, Merrill I., "Radar Handbook", Chapter 3.2, McGraw-Hill, New York, 1970). The real multiplier 1310 weights (windows) the incoming data to shape the filter's frequency response. Typical weighting functions 1320 would be Taylor, Hamming, or Hanning functions. The data are folded before and after the FFT. Only positive frequencies are kept at the FFT's output. The negative frequencies are discarded since they are just the complex conjugates of the positive frequencies, which is the result from passing real data through an FFT. The FFT's output data points are complex numbers with both a real and an imaginary part. Each data point out of the FFT represents a different range as per the following equation:

$$R = c \cdot f / (2 \cdot fmRate)$$

Where:
f = The frequency point out of the FFT
fmRate = The frequency-vs.-time slope of the transmitted waveform.

The complex multiplier 1340 provides a phase rotation of the data points as a function of range. This is a correction for the fact that the center data point (the zeroth data point) does not occur at the time represented by the transmitter's center frequency for the pulse. The tilted line 1200 in FIG. 12 represents the position (time) of the center frequency as a function of range or frequency. The equation for this correction is:

$$PhsCor1350 = \mathrm{Exp}\left(j \cdot \frac{8 \cdot \pi \cdot fmRate}{c^2} \cdot R \cdot (R - R_0)\right)$$

Where:
Exp(x) = The Napierian constant, 2.718281828 ..., raised to the power x.
$R_0$ = The range at which the zeroth data point lines up with the transmitter's center frequency.
j = The square root of minus one.

Each complex number from the range processor represents the return energy from all scatterers within a given range interval (or cell) from the sensor. The size of this range cell depends upon the bandwidth of the transmitted signal. As mentioned earlier it typically will be between 1 and 10 feet. This information is the "time of arrival" range estimate.

The output of the range-processing device 1008 goes to the distribution circuit 1020. The distribution circuit 1020 separates the single time-shared data stream into multiple data streams, one for each of the different frequencies. Each output from the distribution circuit, except the first output 1022, goes to Interpolation Network 1030, etc., where the effective pulse-transmission times are changed to correspond to the transmission time of the first channel. The interpolation is between data from different pulses, not data within a pulse. This interpolation compensates for the fact that the pulses for the multiple frequency channels were not transmitted simultaneously due to the time-sharing.

Figure 14:
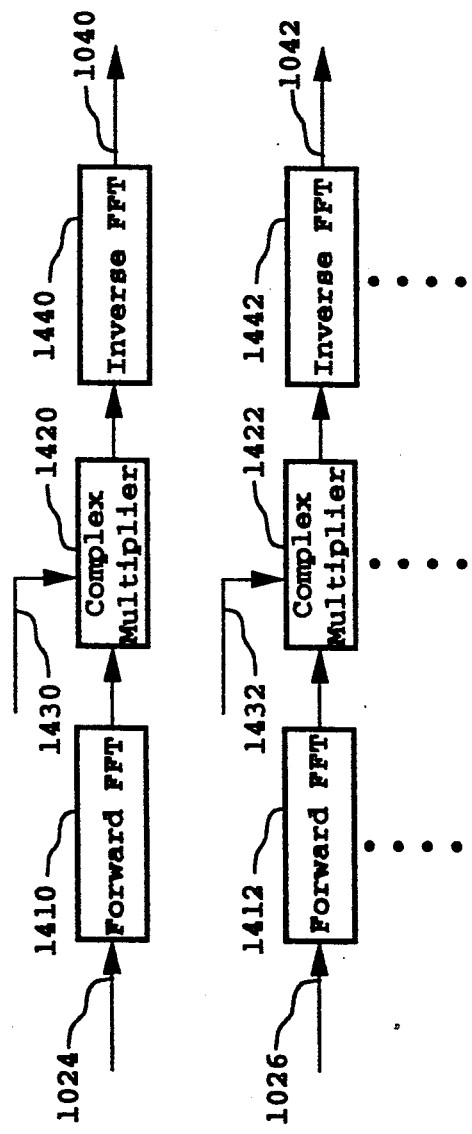
FIG. 14 is a block diagram useful in explaining the use of Fast Fourier Transformation for interpolation in the system of FIG. 10.

Most standard interpolation techniques could be used. Even linear interpolation could be used in some cases. Better interpolation is provided by the use of spline functions or resampling filters. The technique of choice is to use Fast-Fourier-Transform technology as illustrated in FIG. 14. This technique uses the principle that a time shift in the time domain is equivalent to a linear-phase-vs.-frequency shift in the frequency domain. FFTs 1410, 1412, etc. transform the data from the time domain to the frequency domain and Inverse FFTs 1440, 1442, etc. transform the data from the frequency domain back to the time domain. For each frequency channel (except the first), data 1024, 1026, etc. from a single range cell over many pulses (128 pulses as an example) are supplied to the FFT circuits 1410, 1412, etc. This input data set is numbered from −64 to +63, for example. Likewise, the FFT output data set is numbered from −64 to +63. This is sometimes referred to as "folding" the FFT input and output data sets. The transformed data are sent to the complex multipliers 1420, 1422, etc. where the data are given a Doppler-frequency-dependent phase rotation by multiplying by Signals 1430, 1432, etc. These are indicated by:

$$Sig1430 = \mathrm{Exp}\left(j \cdot \frac{2 \cdot \pi \cdot A2 \cdot i}{FTSz}\right)$$

$$Sig1432 = \mathrm{Ex} - \left(j \cdot \frac{2 \cdot \pi \cdot A3 \cdot i}{FTSz}\right)$$

Where
FTSz = The size of the FFT. = 128 for the example.
i = The number of the FFT output sample. For the example, i is between −64 and +63.
A2 = The amount of shift, in transmitter pulse intervals, needed to make the second-frequency data align with the first-frequency data. As an example, if there are three frequencies then A2 would typically be ⅓.
A3 = The amount of shift, in slow-time samples, needed to make the third-frequency data align with the first-frequency data. For the same example, A3 would typically be 2/3.

These multiplications are followed by the inverse Fourier transforms 1440, 1442, etc., again with the input and output data folded. This procedure is repeated for each range cell of interest. Then, some of the data (about half for example) are replaced with new data returned from the next set of 64 pulses and the procedure is started over. Since only half the data is replaced, only half the output data points from the previous inverse FFT are kept (those numbered from −32 to +31).

On a pulse-by-pulse basis, the input to an interpolation box can be thought of as being stored in a first-in, first-out (FIFO) buffer. After the first iteration, where 128 pulses are needed to fill the buffer, the next 64 pulses are brought into the buffer. Each iteration produces 64 output data points for each range cell, the center points from the inverse FFT.

Returning to FIG. 10, the data 1040, etc. from the interpolation networks plus the data 1022 from the first output of the distribution circuit each go to a Doppler filter bank 1050 or 1052 etc. Each data channel contains a complete bank of filters. As with the FFTs discussed earlier, the Doppler filters, easily implemented by those skilled in the art, operate on data across pulses rather than along pulses, i.e., data from each range cell is filtered over many transmitter pulses.

Figure 15:
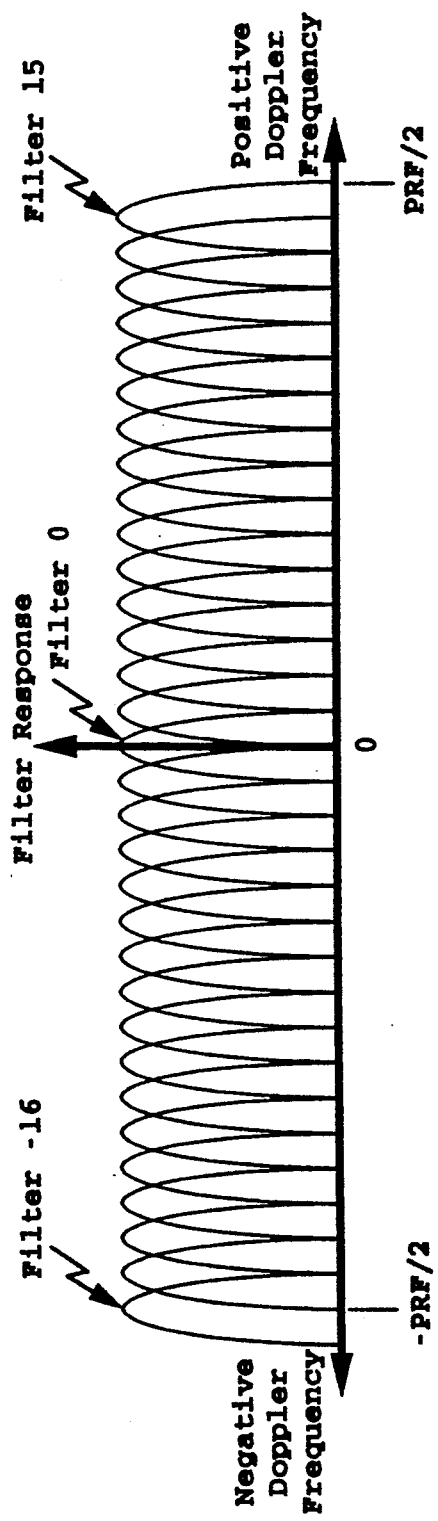
FIG. 15 is a diagram illustrating the frequency responses of all the filters within a Doppler filter bank in FIG. 10.

FIG. 15 illustrates the typical response of all the filters within the bank. A typical value for the pulse-repetition frequency (PRF) is 10,000 pulses per second. The number of filters shown, 32, is for illustration only. A more typical number would be 128. The phase characteristics of the filters are important since phase is used for the range measurement. Because of this, finite-impulse-response (FIR) filters with symmetric impulse responses are the preferred choice. Another choice would be the use of a Fourier-transform instrumentation of such FIR filter banks. Such filters can be designed to have perfectly linear-phase-versus-frequency characteristics.

The output of any filter bank 1060 or 1062 or etc. is a three dimensional set of data. The three dimensions are range, Doppler frequency, and pulse-to-pulse time (i.e., "slow" time). Each digital number represents the return from a specific range cell, a specific Doppler cell (Doppler-frequency interval), and at a specific time. It is convenient to keep in mind that the return in a specific Doppler cell is the return from scatterers that are traveling at a specific velocity with respect to the sensor's antenna phase center.

FIG. 16 illustrates what a range/Doppler array output might look like at one point in time for a tennis ball. The purpose of this array of data is to be able to separate the return of the object from the return of all other objects (clutter) in the antenna beam. In any application there is a very high probability that the object's return will occupy a unique range and Doppler cell with no competing clutter within that cell. By using redundant sensors, then the probability can be made minuscule that the object is not separable in at least three sensors. A particular sensor is declared available for use in measuring the object's position if the ratio of the energy of the cell containing the object's return to that in surrounding cells is greater than a specified threshold.

Data 1060 from the first Doppler filter bank (it could be any filter bank or more than one) goes to the object location and tracking circuit 1070 in FIG. 10 where all a priori knowledge of the range and Doppler frequency of the object is used (along with the known return characteristics of the object) to locate the range/Doppler cell which contains the return of the object. Once located, the object is tracked in range and Doppler frequency until there is an abrupt change, such as a tennis ball being struck with a racquet or a baseball with a bat, at which time a new search is instigated.

The new search may only need to be across Doppler cells since an abrupt position change is usually not encountered because of the high PRF. The location of the cell containing the return signal 1072 of the ball is sent to the range and Doppler cell selection circuits 1080, 1082, etc. to indicate which data cells are to be selected. The Doppler cells to be selected change between transmitter-frequency channels, since Doppler frequency is also a function of the transmitted frequency.

The outputs 1060, 1062, etc. of the Doppler filter banks also go to the range and Doppler cell selection boxes 1080, 1082, etc. where the cells (one or more from each transmitter-frequency channel for each pulse) which contain the return of the object of interest are selected and passed on to the range measurement circuit 160. While data from only one range interval are generally required, there may be times when data from multiple Doppler cells at that one range interval are desired. Such times would be when a tennis ball strikes the court. At this time the return energy from the ball is spread across several Doppler cells. During this interval of time, it may be more accurate to use the data from all Doppler cells containing return energy from the ball and add them together prior to determining the phase of the return. This operation is performed in the range and Doppler cell selection box. The proper addition of data from different Doppler cells places another restriction on the Doppler filter bank design. The filter band-pass characteristics should be designed such that when the outputs of adjacent filters are added together, the resultant filter characteristic is still nominally flat, just wider. This condition is easily met.

The range-cell-location part 151 of Signal 1072 also goes to the range-measurement circuit 160 to give the crude (time-of-arrival) range to the object. The range-measurement box 160 first determines the precise but ambiguous range from the phase of the data in each channel. The equations for this are:

$$Mod(R_{1a}, \lambda_{1a}/2) = \frac{\lambda_{1a} \cdot \phi_{1a}}{4 \cdot \pi}$$

$$Mod(R_{2a}, \lambda_{2a}/2) = \frac{\lambda_{2a} \cdot \phi_{2a}}{4 \cdot \pi}$$

.
.
.
.

With $$\phi_{1a} = 4 \text{ Quadrant arctan}\left(\frac{\text{Imag}_{1a}}{\text{Real}_{1a}}\right)$$

$$\phi_{2a} = 4 \text{ Quadrant arctan}\left(\frac{\text{Imag}_{2a}}{\text{Real}_{2a}}\right)$$

.
.
.
.

$\text{Imag}_{1a}$ = The imaginary part of the selected data point for frequency 1, sensor a.

$\text{Imag}_{2a}$ = The imaginary part of the selected data point for frequency 2, sensor a.

.
.
.

$\text{Real}_{1a}$ = The real part of the selected data point for frequency 1, sensor a.

Real$_{2a}$ = The real part of the selected data point for frequency 2, sensor a.

.
.
.

These above results are then used by the Chinese Remainder Theorem, as outlined previously, to change the range ambiguity from $\{\lambda_{1a}/2, \lambda_{2a}/2, \ldots\}$ to $\{(\lambda_{1a}/2) \cdot (N_2 \cdot N_3 \cdots)\}$, where $N_1, N_2, \ldots$ are the integers used in selecting the transmitter frequencies.

The unambiguous range for this one sensor (the a-th sensor) is finally given by (there are, of course, similar equations for the other sensors)

$$R_a = ChR_a + \frac{q_a \cdot \lambda_{1a} \cdot (N_2 \cdot N_3 \cdots)}{2} + ObC$$

Where $$q_a = \frac{2 \cdot (RngC_a \cdot CellSp - ChR_a)}{\lambda_{1a} \cdot (N_2 \cdot N_3 \cdots)},$$

Rounded to nearest integer
and:
ChR$_a$=The range as determined by the Chinese Remainder Theorem.
RngC$_a$=The number of the range cell that contained the return of the object (the zeroth cell is at zero range.)
CellSp=The spacing between range cells.
ObC=The calibrated distance from the phase center of the object's return to the center of the object.

This precision-range-measurement output signal 162, for each sensor, is sent to the position-measurement circuit 170 of FIG. 4. This completes the discussion on the processor.

Thus, the invention provides a radar device with a unique method of precision range measurements to an object, such as a moving tennis ball, in a region, such as a tennis court, based on the phase of the radar-return from the object. Multiple frequencies and the Chinese Remainder Theorem are used to remove the range ambiguity inherent in using phase as a measurement of range. The radar-return signals from the object are separated from clutter return signals, which can be aided by controlling the antenna illumination pattern, range gating, Doppler filtering, clutter cancellation techniques, etc. In this invention no "counting frequency" is required and the accuracy can be a very small fraction of the transmitting wavelength, restricted only by receiver noise and other anomalies.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method of precisely measuring the positions of a generally symmetrical object in motion, in a predefined three-dimensional region, comprising the steps of:
   (a) transmitting multiple radar signals from each of first, second, and third spaced antenna devices, respectively, into the three-dimensional region, the object reflecting multiple return signals corresponding to the multiple radar signals, respectively;
   (b) sensing the return signals by means of receivers connected to the first, second, and third antenna devices, respectively;
   (c) comparing the return signals with the corresponding transmitted multiple radar signals, respectively, to determine phases of the return signals relative to phases of the corresponding transmitted multiple radar signals, respectively, to obtain ambiguous representations of first, second, and third ranges of the object relative to the first, second, and third antenna devices, respectively;
   (d) removing ambiguities of the first, second, and third ranges using modular arithmetic to obtain first, second, and third less-ambiguous ranges or unambiguous ranges of the object relative to the first, second, and third antenna devices, respectively;
   (e) if the ambiguities removed in step (d) do not result in an unambiguous region sufficiently large to define first, second, and third unambiguous ranges of the object, using first, second, and third time of arrival range information and/or a priori information in conjunction with the first, second, and third less ambiguous ranges to obtain the first, second, and third unambiguous ranges of the object; and
   (f) computing three-dimensional coordinates of the object using the first, second, and third unambiguous ranges and the coordinates of the first, second, and third antenna devices.

2. The method of claim 1 including transmitting multiple radar signals from one or more additional spaced antenna devices, and performing steps similar to steps (a)-(f) to obtain additional three-dimensional coordinates of the object, and averaging corresponding values of each of the three-dimensional coordinates to obtain more-robust three-dimensional coordinates of the object.

3. The method of claim 2 including eliminating three-dimensional coordinates the error of which exceeds a preselected value.

4. The method of claim 1 including repetitively comparing three-dimensional coordinates of the object in motion in the three-dimensional region to model boundaries determined by a mathematical-boundary model and producing indications of the object's position relative to such boundaries.

5. The method of claim 1 including computing projected trajectory coordinates of the object in motion, comparing actual coordinates of the object in motion with the corresponding projected coordinates, and computing preselected characteristics of the object from differences therebetween.

6. A method of precisely measuring the three-dimensional positions of a set of at least four spaced antenna devices and a set of spaced signal reflectors at various fixed positions relative to a three-dimensional region of interest, comprising the steps of:
   (a) taking the position of one of the antenna devices or signal reflectors as the origin of the three dimensional coordinate system and taking the line between this origin and one other antenna device or corner reflector as one of a plurality of coordinate axes;

(b) transmitting multiple radar signals from each of the spaced antenna devices, respectively, into the three-dimensional region containing the set of signal reflectors, each signal reflector reflecting multiple return signals corresponding to the multiple radar signals, respectively;

(c) sensing the return signals of each signal reflector by means of receivers connected to each of the set of antenna devices, respectively;

(d) comparing the return signals from each of the signal reflectors with the corresponding transmitted multiple radar signals, respectively, to determine phases of the return signals relative to phases of the corresponding transmitted multiple radar signals, respectively, to obtain ambiguous representations of the range of each antenna device relative to each signal reflector;

(e) removing ambiguities of each of the set of ranges using modular arithmetic to obtain a less-ambiguous range or unambiguous range from each of the set of antenna devices to each of the set of signal reflectors;

(f) if the ambiguities removed in step (e) do not result in an unambiguous region sufficiently large to define the above set of unambiguous ranges, using time-of-arrival range information from each antenna device to each signal reflector and/or a priori information in conjunction with the less-ambiguous range from each antenna device to each signal reflector to obtain the unambiguous range from each antenna device to each signal reflector;

(g) obtaining crude three dimensional coordinates of each of all antenna devices and all signal reflectors from a priori information, and computing, using the unambiguous ranges and the crude three-dimensional coordinates, more precise three-dimensional coordinates of each antenna device and each signal reflector;

(h) periodically repeating the sequence of steps (b)–(g) to update all the three dimensional positions as ambient conditions change.

7. A method for obtaining a mathematical-boundary-model of a three-dimensional region of interest, comprising the steps of:

(a) placing signal reflectors, either simultaneously or in sequence, on various boundary points of the region;

(b) transmitting multiple radar signals from each of a set of at least three spaced antenna devices, respectively, into the three-dimensional region containing the signal reflectors, each signal reflector reflecting multiple return signals corresponding to the multiple radar signals, respectively;

(c) sensing the return signals of each signal reflector by means of receivers connected to each of the set of antenna devices, respectively;

(d) comparing the return signals from each of the signal reflectors with the corresponding transmitted multiple radar signals, respectively, to determine phases of the return signals relative to phases of the corresponding transmitted multiple radar signals, respectively, to obtain ambiguous representations of the range of each antenna device relative to each signal reflector;

(e) removing ambiguities of each of the set of ranges using modular arithmetic to obtain a less-ambiguous range or unambiguous range from each of the set of antenna devices to each of the set of signal reflectors;

(f) if the ambiguities removed in step (e) do not result in an unambiguous region sufficiently large to define the above set of unambiguous ranges, using time-of-arrival range information from each antenna device to each signal reflector and/or a priori information in conjunction with the less-ambiguous range from each antenna device to each signal reflector to obtain the unambiguous range from each antenna device to each signal reflector;

(g) computing, using the unambiguous ranges and the three-dimensional coordinates of the antenna devices, the three-dimensional coordinates of each of the signal reflectors and thereby the boundary points; and (h) generating a mathematical-boundary-model using the boundary points obtained in step (g), for each combination of three antenna devices.

8. A system for precisely measuring the positions of a generally symmetrical object in motion, in a predefined three-dimensional region, comprising in combination:

(a) first, second, and third spaced antenna devices;

(b) means for transmitting multiple radar signals from each of first, second, and third spaced antenna devices, respectively, into the three-dimensional region, the object reflecting multiple return signals corresponding to the multiple radar signals, respectively;

(c) means for sensing the return signals by means of receivers connected to the first, second, and third antenna devices, respectively;

(d) means for comparing the return signals with the corresponding transmitted multiple radar signals, respectively, to determine phases of the return signals relative to phases of the corresponding transmitted multiple radar signals, respectively, to obtain ambiguous representations of first, second, and third ranges of the object relative to the first, second, and third antenna devices, respectively;

(e) means for removing ambiguities of the first, second, and third ranges using modular arithmetic to obtain first, second, and third less-ambiguous ranges or unambiguous ranges of the object relative to the first, second, and third antenna devices, respectively;

(f) means for computing first, second, and third unambiguous ranges of the object, using first, second, and third time-of-arrival range information and/or a priori information in conjunction with the first, second, and third less ambiguous ranges if the ambiguities removed in step (e) do not result in an unambiguous region sufficiently large to define first, second, and third unambiguous ranges of the object; and (g) means for computing three-dimensional coordinates of the object using the first, second, and third unambiguous ranges and the coordinates of the first, second, and third antenna devices.

9. The system of claim 8 including one or more additional spaced antenna devices, means for transmitting multiple radar signals from the one or more additional spaced antenna devices, and means for computing additional three-dimensional coordinates of the object, and averaging corresponding values of each of the three-dimensional coordinates to obtain more-robust three-dimensional coordinates of the object.

10. The system of claim 9 including means for eliminating three-dimensional coordinates the error of which exceeds a preselected value.

11. The system of claim 8 including means for obtaining a mathematical-boundary-model, means for repetitively comparing three-dimensional coordinates of the object in motion in the three-dimensional region to court model boundaries determined by the mathematical-boundary-model and producing indications of the object's position relative to such boundaries.

12. The system of claim 8 including means for computing projected trajectory coordinates of the object in motion, means for comparing actual coordinates of the object in motion with the corresponding projected coordinates, and means for computing preselected characteristics of the object from differences therebetween.

13. A system for precisely measuring the three-dimensional positions of a set of at least four spaced antenna devices and a set of spaced signal reflectors at various fixed positions relative to a three-dimensional region of interest, comprising in combination:
 (a) a set of at least four antenna devices and a set of signal reflectors;
 (b) means for taking a position of one of the antenna devices or signal reflectors as the origin of the three-dimensional coordinate system and taking a line between this origin and one other antenna device or corner reflector as one of the coordinate axes;
 (c) means for transmitting multiple radar signals from each of the set of spaced antenna devices, respectively, into the three-dimensional region containing the set of signal reflectors, means for each signal reflector reflecting multiple return signals corresponding to the multiple radar signals, respectively;
 (d) means for sensing the return signals of each signal reflector by means of receivers connected to each of the set of antenna devices, respectively;
 (e) means for comparing the return signals from each of the signal reflectors with the corresponding transmitted multiple radar signals, respectively, to determine phases of the return signals relative to phases of the corresponding transmitted multiple radar signals, respectively, to obtain ambiguous representations of the range of each antenna device relative to each signal reflector;
 (f) means for removing ambiguities of each of the set of ranges using modular arithmetic to obtain a less-ambiguous range or unambiguous range from each of the set of antenna devices to each of the set of signal reflectors;
 (g) means for using time-of-arrival range information from each antenna device to each signal reflector and/or a priori information in conjunction with the less-ambiguous range from each antenna device to each signal reflector to obtain the unambiguous range from each antenna device to each signal reflector, if the ambiguities removed by the means of step (f) do not result in an unambiguous region sufficiently large to define the above set of unambiguous ranges;
 (h) means for obtaining the crude three dimensional coordinates of each of the antenna devices and all signal reflectors from a priori information, and means for computing, using the unambiguous ranges and the crude three-dimensional coordinates, more precise three-dimensional coordinates of each antenna device and each signal reflector.

14. A system for obtaining a mathematical-boundary-model of the region of interest, comprising in combination:
 (a) a set of at least three antenna devices and at least one signal reflector;
 (b) means for placing signal reflectors, either simultaneously or in sequence, on various boundary points of the three-dimensional region;
 (c) means for transmitting multiple radar signals from each of a set of at least three spaced antenna devices, respectively, into the three-dimensional region containing the signal reflectors, means for each signal reflector reflecting multiple return signals corresponding to the multiple radar signals, respectively;
 (d) means for sensing the return signals of each signal reflector by means of receivers connected to each of the set of antenna devices, respectively;
 (e) means for comparing the return signals from each of the signal reflectors with the corresponding transmitted multiple radar signals, respectively, to determine phases of the return signals relative to phases of the corresponding transmitted multiple radar signals, respectively, to obtain ambiguous representations of the range of each antenna device relative to each signal reflector;
 (f) means for removing ambiguities of each of the set of ranges using modular arithmetic to obtain a less-ambiguous range or unambiguous range from each of the set of antenna devices to each of the set of signal reflectors;
 (g) means for using time-of-arrival range information from each antenna device to each signal reflector and/or a priori information in conjunction with the less-ambiguous range from each antenna device to each signal reflector to obtain the unambiguous range from each antenna device to each signal reflector, if the ambiguities removed by means of step (f) do not result in an unambiguous region sufficiently large to define the above set of unambiguous ranges;
 (h) means for computing, using the unambiguous ranges and the three-dimensional coordinates of the antenna devices, the three-dimensional coordinates of each of the signal reflectors and thereby the boundary points for each combination of three antenna devices; and
 (i) means for generating a mathematical-boundary-model using the boundary points.

* * * * *